US009451552B2

(12) United States Patent
Lim et al.

(10) Patent No.: US 9,451,552 B2
(45) Date of Patent: Sep. 20, 2016

(54) METHOD AND DEVICE FOR MANAGING RESOURCES OF BASE STATION IN WIRELESS COMMUNICATION SYSTEM

(75) Inventors: Chae Gwon Lim, Seoul (KR); Young Joo Suh, Pohang-si (KR); Beom Sik Bae, Suwon-si (KR); Song Yean Cho, Seoul (KR); Dong Wook Kim, Pohang-si (KR); Joo Young Baek, Pohang-si (KR); Jeong Yoon Lee, Pohang-si (KR); Jae Pil Jeong, Pohang-si (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 403 days.

(21) Appl. No.: 13/990,001

(22) PCT Filed: Dec. 8, 2011

(86) PCT No.: PCT/KR2011/009471
  § 371 (c)(1),
  (2), (4) Date: May 28, 2013

(87) PCT Pub. No.: WO2012/077992
  PCT Pub. Date: Jun. 14, 2012

(65) Prior Publication Data
  US 2013/0242935 A1     Sep. 19, 2013

(30) Foreign Application Priority Data

Dec. 10, 2010 (KR) .................. 10-2010-0126212

(51) Int. Cl.
  *H04W 52/14*    (2009.01)
  *H04B 7/02*     (2006.01)
  *H04W 28/26*    (2009.01)
  *H04J 11/00*    (2006.01)
  *H04W 52/24*    (2009.01)

(Continued)

(52) U.S. Cl.
  CPC .......... *H04W 52/143* (2013.01); *H04B 7/022* (2013.01); *H04J 11/0056* (2013.01);
  (Continued)

(58) Field of Classification Search
  CPC .................................................. H04W 52/143
  See application file for complete search history.

(56) References Cited

U.S. PATENT DOCUMENTS

2005/0232149 A1*  10/2005  Matuoka .......... H04W 72/1242
                                              370/230
2006/0203724 A1*   9/2006  Ghosh .................... H04L 47/10
                                              370/229

(Continued)

FOREIGN PATENT DOCUMENTS

KR   10-2010-0014715 A    2/2010
KR   10-2010-0020612 A    2/2010

(Continued)

*Primary Examiner* — Charles C Jiang
*Assistant Examiner* — Thad Defauw
(74) *Attorney, Agent, or Firm* — Jefferson IP Law, LLP

(57) ABSTRACT

A method and a device for managing resources of a base station in a wireless communication system is provided. The method comprises: calculating an average resource use of serving resources, which are used as downlinks from a serving base station to a plurality of communication terminals; selecting one of the communication terminals, which has a maximum interference from a neighbor base station, if the calculated average resource use exceeds a preset threshold; and making a reservation for at least one of neighbor resources used as downlinks from the neighbor base station, the at least one neighbor resource corresponding to the serving resource for the selected communication terminal, so that the neighbor base station may decrease transmission power in the at least one neighbor resource.

12 Claims, 6 Drawing Sheets

(51) Int. Cl.
*H04W 52/34* (2009.01)
*H04W 16/10* (2009.01)
*H04W 28/04* (2009.01)
*H04W 88/08* (2009.01)
*H04L 5/00* (2006.01)
*H04W 72/08* (2009.01)

(52) U.S. Cl.
CPC .......... *H04W 16/10* (2013.01); *H04W 28/26* (2013.01); *H04W 52/243* (2013.01); *H04W 52/343* (2013.01); *H04L 5/0032* (2013.01); *H04L 5/0073* (2013.01); *H04W 28/048* (2013.01); *H04W 72/082* (2013.01); *H04W 88/08* (2013.01); *Y02B 60/50* (2013.01)

(56) References Cited

U.S. PATENT DOCUMENTS

| | | | | |
|---|---|---|---|---|
| 2007/0042799 | A1* | 2/2007 | Jubin | H04W 52/04 455/522 |
| 2008/0039129 | A1* | 2/2008 | Li | H04L 1/0003 455/522 |
| 2009/0247181 | A1* | 10/2009 | Palanki | H04L 1/0036 455/452.2 |

FOREIGN PATENT DOCUMENTS

| | | |
|---|---|---|
| KR | 10-2010-0066558 A | 6/2010 |
| KR | 10-2010-0126722 A | 12/2010 |

* cited by examiner

METHOD AND DEVICE FOR MANAGING RESOURCES OF BASE STATION IN WIRELESS COMMUNICATION SYSTEM

BACKGROUND OF THE INVENTION

1. Field of the Invention

The present invention relates to an operation method and apparatus of a base station in a wireless communication system and, in particular, to a resource management method and apparatus of the base station.

2. Description of the Related Art

Typically, a wireless communication system provides communication services with various service qualities at high data rate. An Orthogonal Frequency Division Multiplexing (OFDM) based wireless communication system is such a wireless communication system. OFDM is a multi-carrier method for transmitting data on multiple subcarriers arranged at even intervals to guarantee orthogonality and advantageous in frequency utilization efficiency and robustness to multi-path fading.

DISCLOSURE OF INVENTION

Technical Problem

However, such a wireless communication system has a problem of Inter Cell Interference (ICI) caused when the adjacent base stations transmit signals on the same subcarrier. That is, the signals transmitted on the same subcarrier cause interferences to the adjacent base stations. The inter-cell interference degrades the channel utilization efficiency in the wireless communication system. As a consequence, the throughput of the wireless communication system is degraded.

The present invention aims to improve the throughput of the wireless communication system. In order to accomplish this, the present invention provides an Inter Cell Interference Coordination (ICIC) method for use in the wireless communication system.

Solution to Problem

In accordance with an aspect of the present invention, a resource management method of a base station in a wireless communication system includes calculating, at a serving base station, average resource use amount of serving resources for use in downlink in corresponding to multiple terminals, selecting, when the average resource use amount is greater than a predetermined threshold, one of terminals, the selected terminal undergoing highest interference from a neighbor base station, and reserving at least one of neighbor resources of the neighbor base station for use in downlink for reducing transmission power of selected neighbor resource, the selected neighbor resource corresponding to the serving resource for the selected terminal.

Preferably, the resource management method further includes recovering, when reservation of at least one of the neighbor resources fails, the reserved serving resource by increasing reduced transmission power in correspondence to the serving resource reserved for the neighbor base station.

In accordance with another aspect of the present invention, a resource management apparatus of a base station in a wireless communication system includes a resource use amount calculator which calculates average resource use amount of serving resources for use in downlink in corresponding to multiple terminals and a resource reservation processing unit which selects, when the average resource use amount is greater than a predetermined threshold, one of terminals, the selected terminal undergoing highest interference from a neighbor base station and reserves at least one of neighbor resources of the neighbor base station for use in downlink for reducing transmission power of selected neighbor resource, the selected neighbor resource corresponding to the serving resource for the selected terminal.

Preferably, the resource management apparatus further includes a resource recovery processing unit which recovers, when reservation of at least one of the neighbor resources fails, the reserved serving resource by increasing reduced transmission power in correspondence to the serving resource reserved for the neighbor base station.

Advantageous Effects

The resource management method and apparatus of the eNB in a wireless communication system according to the present invention is capable of suppressing interference from neighbor eNBs on the serving resource for one of UEs connected to the eNB by reserving one of the resources of the neighbor eNB for which transmission power is reduced. Also, the resource management method and apparatus of the eNB in a wireless communication system according to the present invention is capable of suppressing interference caused by an eNB on the neighbor resource for one of the UEs connected to the neighbor eNB by reducing the transmission power on one of the serving resources reserved for the neighbor eNB. Also, the resource management method and apparatus of the eNB in a wireless communication system according to the present invention is capable of releasing, when it fails to reserve neighbor resource at a neighbor eNB, reservation of the serving resource corresponding to the neighbor eNB to increase the transmission power on the corresponding serving resource and thus secure the serving resource for use.

In this way, the eNB is capable of managing the serving resources efficiently. Additionally, it is possible to manage the resource efficiently in the wireless communication system.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
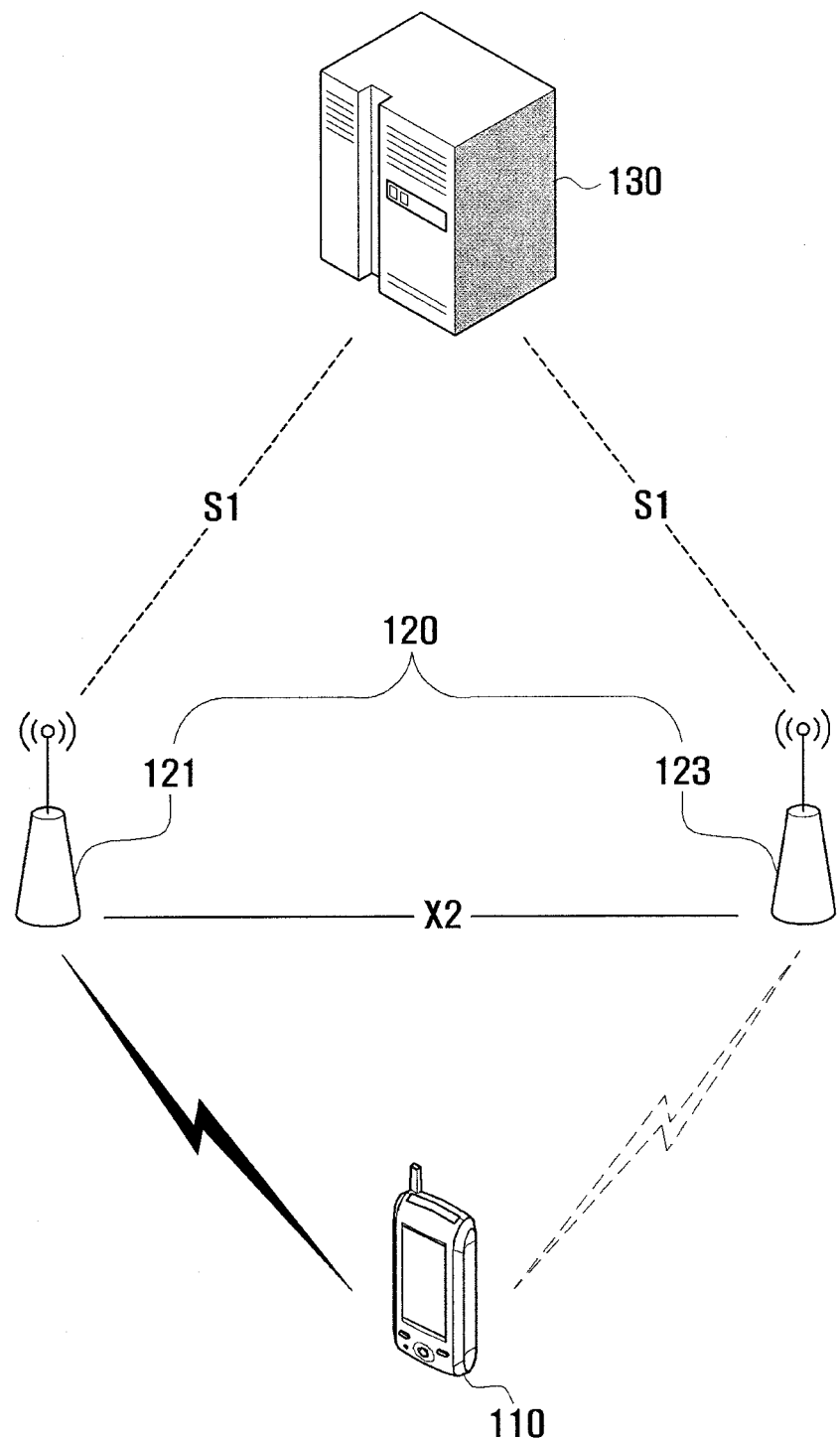
FIG. 1 is a schematic diagram illustrating a wireless communication system according to an embodiment of the present invention.

FIG. 1 is a schematic diagram illustrating a wireless communication system according to an embodiment of the present invention. Although the embodiment is directed to a Long Term Evolution (LTE) system as the wireless communication system, the present invention is not limited thereto.

Referring to FIG. 1, the wireless communication system according to this embodiment includes a User Equipment (UE) 110, an evolved Node B (eNB) 120, and a Core Network node 130.

The UE 110 uses a communication service through wireless communication. Here, the communication service may be a voice services or a data service. Also, the UE 110 may be fixed or mobile.

The eNB 120 manages a cell and supports wireless communication of the UE 110 within the cell. Here, the cell may be the cell of a normal cellular system. The terms 'eNB' and 'cell' can be used interchangeably in the same meaning. The eNB 120 establishes a radio channel with the UE 110 and controls radio resource. For example, the eNB 120 is capable of generating system information to broadcast intra cell information and allocating radio resources for communicating packet data or control information with the UE 110. Here, the system information may include operator information (PLMN ID; PLMN Indicator) of the wireless network Public Land Mobile Network (PLMN) accessible via the eNB 120, eNB Cell Global ID (ECGI), and Tracking Area ID (TAI) of each cell. For this purpose, the eNB 120 is provided with a control protocol such as Radio Resource Control (RRC) protocol related to radio resource management.

At this time, the eNB 120 provides the multiple UEs 110 with communication service through multiple component carriers. That is, the eNB 120 provides the communication service with at least one of the component carriers. For example, if among at least three component carriers the first and third component carriers are assigned to the eNB 120, the eNB provides the communication service using the first and third component carriers. Here, each component carrier includes at least one transmission resource. The transmission resource can be a Physical Resource Block (PRB). That is, the eNB 120 is capable of allocating at least one transmission resource to the UE 110 for use in communication service. The eNB 120 also control the transmission (Tx) power on the transmission resource. Here, the eNB 120 controls the Tx power in a Distributed Power Control scheme according to an embodiment of the present invention.

For a specific UE 110, the eNB 120 can be a serving eNB 121 or a neighbor eNB 123. The serving eNB 121 manages the serving cell in which the UE 110 connects to the eNB 121 substantially. The serving eNB 121 provides the communication service to the UE 110 within the serving cell. The neighbor eNB 123 manages a neighbor cell and is adjacent to the serving eNB 121. Here, the serving eNB 121 and the neighbor eNB 123 are connected to each other through X2 interface. The eNB 120 is capable of receiving Channel State Information (CSI) of the serving and neighbor cells. With the CSI, the eNB 120 manages the transmission resources. That is, the eNB 120 is capable of reserving a transmission resource for the UE 110 in order to prevent the neighbor eNB 123 from using the reserved transmission resource. In addition, the eNB 120 is capable of making a handover decision for the UE 110 and commanding handover.

The core network node 130 manages the UE 110 and the eNB 120 and supports radio communication between the UE 110 and the eNB 120. Here, the core network node 130 connects to the eNB 120 through S1 interface. At this time, the core network node 130 includes at least one of Mobility Management Entity (MME), Serving Gateway (S-GW), Packet Data Network Gateway (P-GW), and Home Subscriber Server (HSS).

The MME manages the UE 110 in idle mode and selects S-GW and P-GW for the UE 110. The MME is responsible for the function related to the roaming and authentication of the UE 110. The MME also processes the bearer signal generated by the UE 110. For this purpose, the MME allocates identity information to the UE 110 and controls the connection of the UE 110 and manages the UE 110 based on the identity information. At this time, the MME communicates with the UE 110 using Non Access Stratum (NAS) messages.

The MME connects to the UE 110 via the eNB 120. The MME also supports plural tracking areas and connects to plural eNBs 120 supporting respective tracking area informations. That is, the plural eNBs 120 supporting the same tracking area information can be connected to the same MME. The eNBs 120 supporting different tracking area informations can connect to the respective MMEs. Also, the eNB 120 supporting different tracking area informations may connect to the same MME 130.

The S-GW connects to the eNB 120 and MME. The S-GW is responsible for controlling mobility of the UE 110. That is, the S-GW works as a mobility anchor for the movement of the UE 110.

The P-GW connects to the S-GW. The P-GW also connects to an Internet Protocol (IP) network. The P-GW is responsible for allocating IP address to the UE 110 and processing packet data. That is, the P-GW delivers the packet data from the IP network to the UE 110 and from the UE 110 to the IP network. The P-GW determines the bearer bandwidth for the UE 110 and performs packet data forwarding and routing function. In addition, the P-GW is capable of working as a mobility anchor for the movement of the UE 110.

The HSS stores the subscription information of the UE 110. The HSS is capable of providing the MME with the subscription information of the UE 110 for use in control of the UE 110.

Assuming the above-structured wireless communication system, a description is made of the configuration and operations of the eNB 120 according to an embodiment of the present invention in detail hereinafter. In the wireless communication system, the eNB operates as the serving eNB 121 of the UE 110 for the corresponding cell and as a neighbor eNB 123 for the neighbor cell. In the following, the description is directed to the configuration and operations of the serving eNB 121 of the UE 110, and this is applied to the eNB 120 of the wireless communication systems identically. In addition, the transmission resource used by the serving eNB 121 is referred to as serving resource, and the transmission resource used by the neighbor eNB 123 is referred to as neighbor resource. Here, the serving resource and the neighbor resource can be the same or different transmission resource(s).

Figure 2:
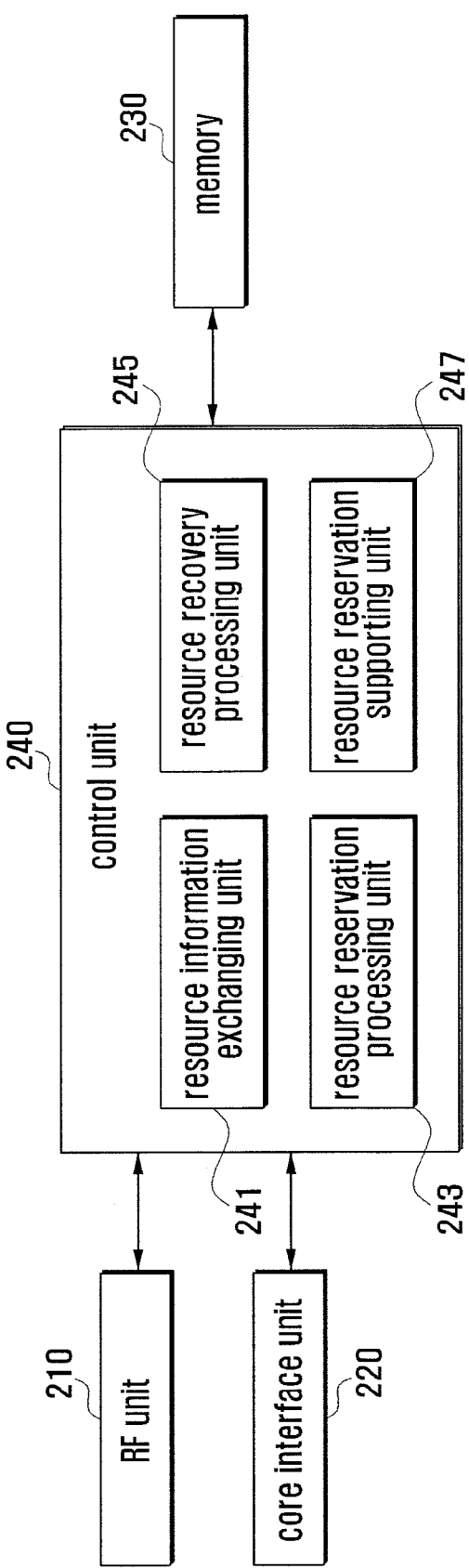
FIG. 2 is a block diagram illustrating the configuration of the eNB according to an embodiment of the present invention.

FIG. 2 is a block diagram illustrating the configuration of the eNB according to an embodiment of the present invention. In this embodiment, the eNB includes macro eNB, pico eNB, and femto eNB.

Referring to FIG. 2, the eNB 120 according to this embodiment includes a Radio Frequency (RF) unit 210, a core interface unit 220, a memory unit 230, and a control unit 240.

The RF unit 210 is responsible for radio communication function of the eNB 120. The RF unit 210 is capable of including a radio interface for communicating signals with the UE 110 and X2 interface for communicating signals with another eNB 120.

The core interface unit 220 is responsible for communication of the eNB 120 with the core network node 130. The core network interface 220 is capable of including a S1 interface for communicating signals with the core network node 130. Here, the core network interface unit 220 is capable of communicating signals with the core network node 130 through wired link.

The memory 230 is provided with program and data memories. The program memory stores programs for controlling general operations of the eNB 120. At this time, the program memory stores the programs for managing the transmission resource according to an embodiment of the present invention. The data memory stores the data generated by the execution of the programs.

The control unit 240 is responsible for controlling overall operations of the eNB 120. The control unit 240 manages transmission resource according to an embodiment of the present invention. The control unit 240 is capable of reserving a neighbor resource at the neighbor eNB 123. That is, the control unit 240 is capable of requesting the neighbor eNB 123 to reduce transmission power on at least one of the neighbor resources. The control unit 240 is also capable of configuring transmission power per serving resource and adjusting transmission power depending on the serving resource. That is, the control unit 240 is capable of supporting reservation of the neighbor eNB 123 for at least one of serving resources and reducing the transmission power of the corresponding serving resource to a predetermined level. The control unit 240 is also capable of releasing the reservation of the serving resource and increasing the transmission power for the corresponding transmission resource to a predetermined level. The control unit 240 includes a resource information exchanging unit 241, a resource reservation processing unit 243, a resource recovery processing unit 245, and a resource reservation supporting unit 247.

The resource information exchanging unit 241 exchanges the resource information, which includes the resource indices and predetermined transmission power levels corresponding to the transmission resources, with the neighbor eNB 123. The resource information exchanging unit 241 is capable of exchanging the resource information with the neighbor eNB 123 at a predetermined period. The resource information exchanging unit 241 also controls storing the resource information. The resource information exchanging unit 241 is provided with a resource use amount calculator. The resource use amount calculator calculates average resource use amount of the eNB 120 for the UEs 110. The resource use amount calculator determines whether the average resource use amount is greater than a predetermined threshold.

The resource reservation processing unit 243 reserves the neighbor resource of the neighbor eNB 123. At this time, if the average resource use amount is greater than the threshold, the resource reservation processing unit 243 selects one of the UEs 110 connected to the eNB 120 which experiences highest interference from the neighbor 123. The resource reservation processing unit 243 reserves the neighbor resource of the neighbor eNB 123 for the corresponding UE 110. At this time, the resource reservation processing unit 243 reserves the neighbor resource having the same index with the reserving resource allocated for the corresponding UE 110. That is, the resource reservation processing unit 243 is capable of requesting the neighbor eNB 123 to reduce the transmission power for the corresponding neighbor resource.

The resource recovery processing unit 245 recovers the serving resource for the neighbor eNB 123. At this time, if it fails to reserve the neighbor resource at the neighbor eNB 123, the resource recovery processing unit 245 determines whether the serving resource is reserved for the neighbor eNB 123. If the serving resource is reserved, the resource recovery processing unit 245 releases the reservation on the corresponding serving resource and increases the transmission power for the corresponding serving resource to a predetermined level.

The resource reservation supporting unit 247 reserves the serving resource for the neighbor eNB 123. That is, if the neighbor eNB 123 requests for the reservation on the serving resource, the resource reservation supporting unit 247 reduces the transmission power for the corresponding serving resource to a predetermined level. In addition, the resource reservation supporting unit 247 is capable of controlling to allocate other serving resource to the UE 110 in correspondence to the corresponding serving resource.

Figure 3:
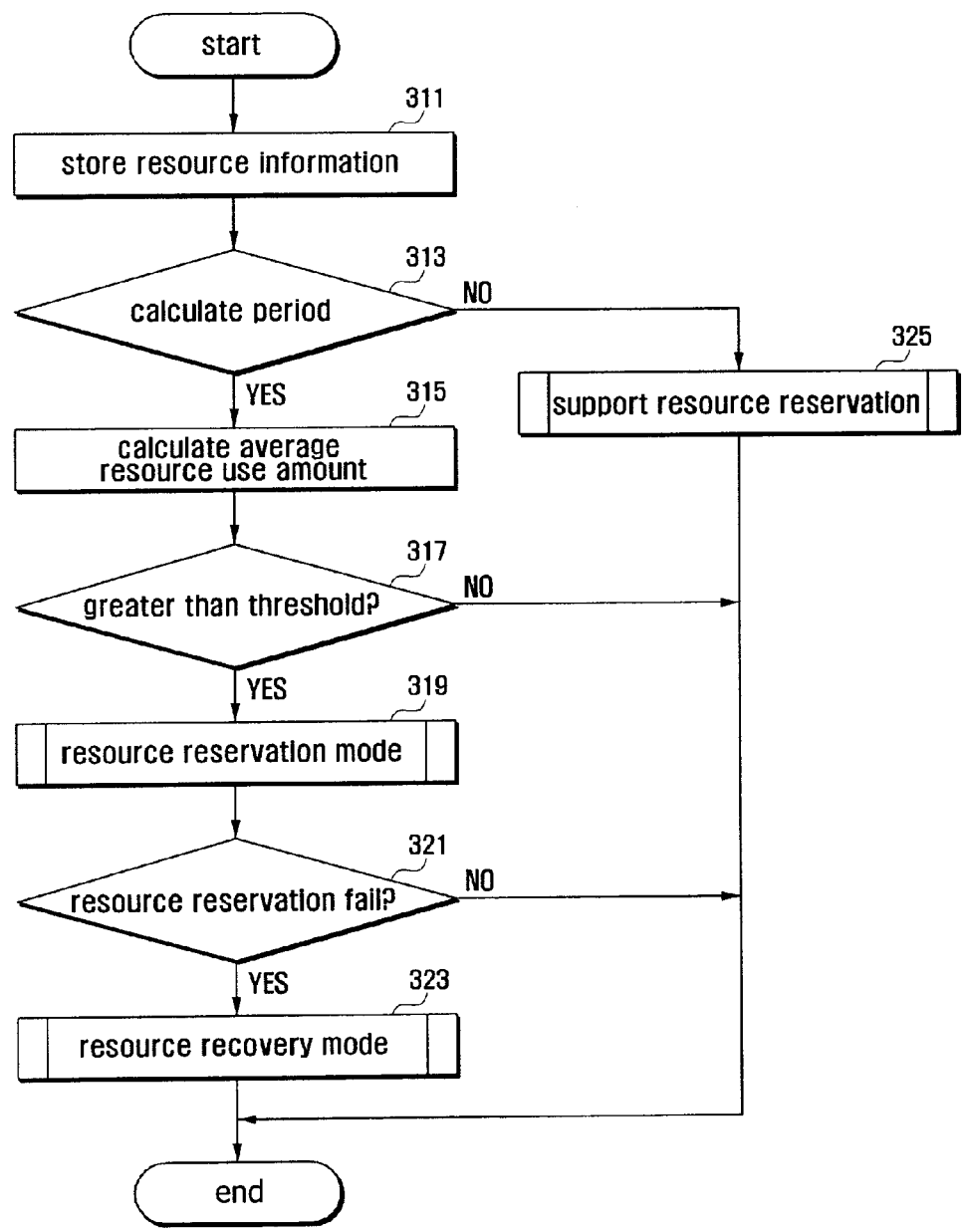
FIG. 3 is a flowchart illustrating the resource management procedure of the eNB according to an embodiment of the present invention.

FIG. 3 is a flowchart illustrating the resource management procedure of the eNB according to an embodiment of the present invention.

Referring to FIG. 3, the resource management procedure of the eNB 120 according to this embodiment starts at the state where the control unit 240 retains the resource information at step 311. At this time, the resource information includes serving resource information on the serving resource of the corresponding eNB 120, neighbor resource information on the neighbor resource of the neighbor eNB 123, and reserved resource information indicating the reservation state of the serving resource of the corresponding eNB 120 corresponding to the neighbor resource. Here, the serving resource information is configured as shown in table 1, the neighbor resource information is configured as shown in table 2, and the reserved resource information is configured as shown in table 3.

TABLE 1

| Serving resource index | Serving resource Tx power | Serving resource Reservation state |
|---|---|---|
| XXXX.0 | level 3 | 0(free) |
| XXXX.1 | level 1 | 1(reserved) |
| XXXX.2 | level 2 | 0(free) |
| — | — | — |

TABLE 2

| Neighbor eNB ID | Average resource use amount | Neighbor resource Index and Tx power | Neighbor resource reservation state | Average processing amount of Neighbor resource | M value |
|---|---|---|---|---|---|
| AAAAA | 70% | {XXXX.0, level 3} | 0(free) | aa Mbps | 0.8 |
| | | {XXXX.1, level 3} | 0(free) | | |

TABLE 2-continued

| Neighbor eNB ID | Average resource use amount | Neighbor resource Index and Tx power | Neighbor resource reservation state | Average processing amount of Neighbor resource | M value |
|---|---|---|---|---|---|
| BBBBB | 40% | {XXXX.0, level 2} | 0(free) | bb Mbps | 0.7 |
|  |  | {XXXX.1, level 3} | 0(free) |  |  |
|  |  | {XXXX.2, level 0} | 1(reserved) |  |  |
| CCCCC | 80% | {XXXX.3, level 0} | 1(reserved) | cc Mbps | 0.6 |
|  |  | {XXXX.4, level 3} | 0(free) |  |  |
| — | — | — | — | — | — |

TABLE 3

| Neighbor eNB ID | Serving resource Index |
|---|---|
| AAAAA | XXXX.1 |
| — | — |

That is, the serving resource information includes at least one of downlink resource use amount at the eNB 120, i.e. number of serving resources, average resource amount for the UEs connected to the eNB 120, index and transmission power per serving resource, and reservation state per serving resource. The neighbor resource information includes cell identity information per neighbor eNB 123, average resource amount corresponding to the downlink neighbor resource per neighbor eNB 123, number of UEs 110 connected to each neighbor eNB 123, index and transmission power per neighbor resource, reservation state per neighbor resource, average processing amount of neighbor resource at UEs 110, and M value per UE 110. Here, the M value denotes the maximum Modulation and coding level as compared to average Modulation and Coding Scheme (MSC).

At this time, the control unit 240 is capable of exchanging the resource information with the neighbor eNB 123 at a predetermined period to share the resource information. That is, the control unit 240 is capable of transmitting to the neighbor eNB 123 at least one of the serving resource information and reserved resource information when a predetermined period arrives. The control unit 240 is also capable of controlling to store the neighbor resource information in the memory 230 when the neighbor resource information is received from the neighbor eNB 123. The control unit 240 is also capable of updating the resource information in the memory unit 230 when the resource reservation mode or resource recovery mode execution or the resource reservation is supported.

If a predetermined calculation period arrives, the control unit 240 detects this at step 313 and calculates the average resource use amount at step 315. That is, the control unit 240 calculates the average resource use amount of the UEs 100 according to the number of UEs 110 connected to the corresponding eNB 120 and the number of serving resources. Next, the control unit 240 compares the average resource use amount with a predetermined threshold at step 317. At this time, the control unit 240 determines whether the average resource amount is greater than the threshold.

If it is determined that the average resource amount is greater than the threshold at step 317, the control unit 240 executes resource reservation mode at step 319. At this time, the control unit 240 reserves the neighbor resource of the neighbor eNB 123. That is, the control unit 240 is capable of requesting the neighbor eNB 123 to reduce the transmission power on the corresponding neighbor resource. In this way, the control unit 240 is capable of mitigating interference from the neighbor eNB 123 on the serving resource for one of the UEs 110. The resource reservation mode execution procedure of the eNB is described in detail hereinafter.

Figure 4:
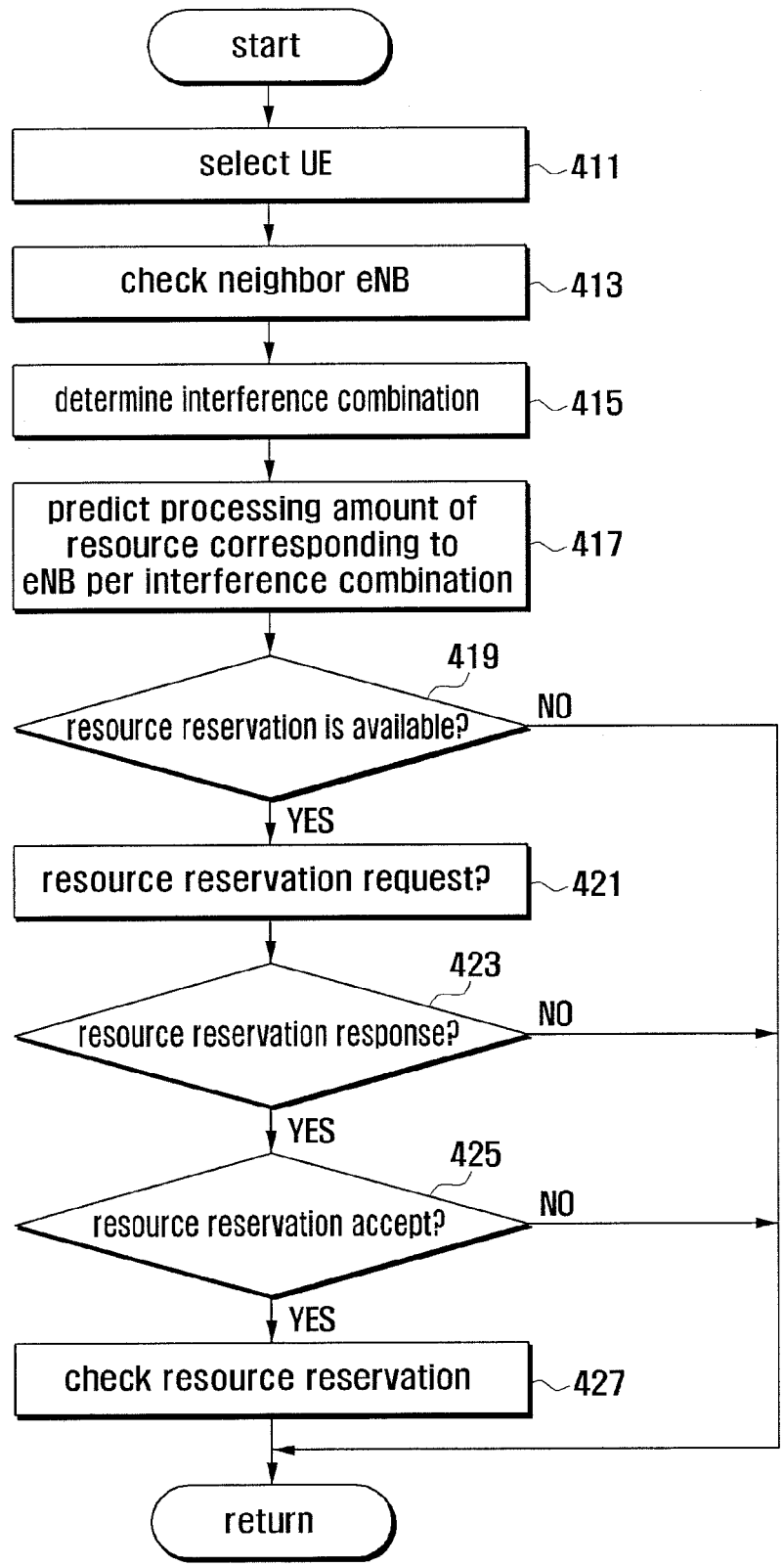
FIG. 4 is a flowchart illustrating the resource reservation mode execution procedure of FIG. 3.

FIG. 4 is a flowchart illustrating the resource reservation mode execution procedure of FIG. 3.

Referring to FIG. 4, the resource reservation mode execution procedure of the eNB according to this embodiment starts with selecting one of the multiple UEs connected to the eNB 120 at step 411. At this time, the control unit 240 selects one of the UEs 110 connected to the eNB 120 which experiences highest interference from the neighbor 123. For example, the control unit 240 is capable of selecting the UE 110 fulfilling the condition of equation (1). That is, the control unit 240 is capable of selecting the UE having the least M value among the UEs 110.

$$k = \arg_k \min\{M_k\},$$

$$M_k = \frac{X_k}{X'_k}$$

Equation (1)

Here, k denotes ID of the UE 110, $X_k$ denotes the substantial average modulation and coding level of the UE, and $X'_k$ denotes the maximum modulation and coding level available without interference from the neighbor eNB 123.

Next, the control unit 240 checks the neighbor eNB 123 through the UE 110 at step 413. At this time, the control unit 240 analyzes the channel state information of the UE 110 to check the neighbor eNB 123. Here, the control unit 240 is capable of acquiring Reference Signal Received Power (RSRP) per neighbor eNB 123 at the UE 110.

Next, the control unit 240 determines the interference combination to the neighbor eNB 123 at step 415. That is, the control unit 240 is capable of comparing the RSRP per eNB 123 with predetermined RSRP threshold. If the RSRP of the neighbor eNB 123 is greater than the RSRP threshold, the control unit 240 extracts the corresponding neighbor eNB 123 as an element of an interference set. At this time, each element can be RSRP corresponding to each neighbor eNB 123. The control unit 240 is capable of determining a subset of the interference set as the interference combination. At this time, the control unit 240 is capable of determining a power set of the interference set as the interference combination. For example, if the interference set S is $\{S_1, S_2\}$, the control unit 240 is capable of determining $\{S_1\}$, $\{S_2\}$, or $\{S_1, S_2\}$ as the interference combination.

Next, the control unit 240 predicts the effective throughput per serving resource at the UE 110 that is capable of being acquired through reservation of the neighbor resource in correspondence to the interference combination at step 417. At this time, the control unit 240 predicts Signal to Noise Ratio (SNR) of the UE 110 that can be acquired through reservation of neighbor resource in correspondence to the respective interference combination. That is, the control unit 240 predicts the sum of the RSRPs per neighbor eNB 123 as interference and calculates the SNR based on interference to the RSRP corresponding to the eNB 120. For example, the control unit 240 is capable of calculating the SNR of the UE 110 corresponding to each interference combination as equation (2).

$$SNR_X = \frac{RSRP_{serving}}{\sum_{k \in A \text{ and not } k \in X} RSRP_k} \qquad \text{Equation (2)}$$

Here, X denotes the identity data of the interference combination, $RSRP_{serving}$ denotes RSRP from the eNB 120, and $RSRP_k$ denotes RSRP from the neighbor eNB 123.

The control unit 240 determines the processing amount per serving resource according to the MCS level corresponding to the SNR of the UE in correspondence to each interference combination. That is, the control unit 240 predicts the bit error rate in the case of determining the transmission power according to the SNR of the UE 110 and calculates the processing amount of the serving resource according to the MCS level of the UE. Afterward, the control unit 240 predicts the processing amount per serving resource corresponding to each interference combination using the processing amount of the serving resource according to the MCS level of the UE 110. For example, the control unit 240 is capable of calculating the processing amount per serving resource at the UE 110 in correspondence to each interference combination as equation (3). Furthermore, in the case that multiple interference combinations exist, the control unit 240 is capable of arrange the interference combinations in a descending order of processing amount per serving resource corresponding to each interference combination.

$$\text{Average Processing Amount of Serving Resource} = \frac{\text{Processing Amount of Serving Resource according to } MCS \text{ Level}}{|X|+1} \qquad \text{Equation (3)}$$

Here, |X| denotes a number of neighbor eNBs 123 in the interference combination.

For example, if one of the interference combinations includes one neighbor eNB 123 and the processing amount of the serving resource corresponding thereto is 8 Mbps, the control unit 240 is capable of predicting the processing amount per serving resource of 4 Mbps. If one of the interference combinations includes two neighbor eNBs 123 and the processing amount of the serving resource corresponding thereto is 9 Mbps, the control unit 240 is capable of predicting the processing amount per serving resource of 3 Mbps.

Next, the control unit 240 determines whether neighbor resource reservation per interference combination is possible at step 419. That is, the control unit 240 determines whether there is neighbor resource available for reservation at the neighbor eNB 123 within the interference combination. At this time, the control unit 240 determines whether there is the neighbor resource corresponding to the transmission resource with the same index as the serving resource for the UE 110. That is, the control unit 240 determines whether the neighbor resource not reserved at the neighbor eNB 123 of the interference combination based on the neighbor resource information of table 2. If it is determined that there is the neighbor resource available for reservation at the eNB 123 of the interference combination, the control unit 240 determines that the neighbor resource reservation is available at the neighbor eNB 123 in the interference combination. Otherwise, if it is determined that there is no neighbor resource available for reservation at the neighbor eNB 123 of the interference combination, the control unit 240 determines that the neighbor resource reservation is not available at the neighbor eNB 123 in the interference combination. The control unit 240 is also capable of selecting one of interference combinations according to the arrangement order of the interference combinations to determine whether the resource reservation is available. If it is determined that the resource reservation is not available, the control unit 240 selects another one according to the arrangement order of the interference combinations to determine the resource reservation is available.

If it is determined that the resource reservation per interference combination is not available at step 419, the control unit 240 returns the procedure to FIG. 3. Otherwise, if it is determined that the resource reservation per interference combination is available at step 419, the control unit 240 requests the neighbor eNB 123 in the interference combination for reservation of neighbor resource at step 421. At this time, the control unit 240 selects at least one of the neighbor resources of the neighbor eNB 123 and requests the neighbor eNBs 123 to reserve the corresponding neighbor resource. That is, the control unit 240 requests for the reservation of the neighbor resource corresponding to the transmission resource with the same index as the serving resource. In order to accomplish this, the control unit 240 is capable of transmitting a resource reservation request message to the neighbor eNB 123. At this time, the resource reservation request message is capable of including a request bitmap indicating the reservation state per neighbor resource. Here, the control unit 240 is capable of generating the request bitmap correspond to the neighbor eNB 123 according to the neighbor resource information of table 2 and transmitting the request bitmap having target neighbor resource bit is set to 1.

If a response is received from the neighbor eNB 123 in reply to the neighbor resource reservation request, the control unit 240 detects this at step 423 and determines whether the neighbor eNB 123 accepts the reservation of the neighbor resource at step 425. That is, when a resource reservation response message is received from the neighbor eNB 123, the control unit 240 analyzes the resource reservation response message to determine whether the neighbor resource reservation is accepted. At this time, the resource reservation response message is capable of including a response bitmap indicating the reservation state per neighbor resource of the neighbor eNB 123. The control unit 240 is capable of checking whether the target resource bit is set to 1 or 0 in the response bitmap. If the target resource bit is set to 1 in the response bitmap, the control unit 240 determines that the neighbor resource reservation is accepted by the neighbor eNB 123. Otherwise, if the target resource bit is set to 0 in the response bitmap, the control unit 240 determines that the neighbor resource reservation is rejected by the neighbor eNB 123.

If it is determined that the neighbor eNB 123 rejects the neighbor resource reservation at step 425, the control unit 204 returns the procedure to FIG. 3. Otherwise, if it is determined that the neighbor eNB 123 accepts the neighbor resource reservation, the control unit 240 checks the reservation of the neighbor resource at the neighbor eNB 123 at step 427 and returns the procedure to FIG. 3. At this time, the control unit 240 requests the neighbor eNB 123 to reduce the transmission power on the corresponding neighbor resource to a predetermined level. For this purpose, the control unit 240 is capable of transmitting a resource reservation confirmation message to the neighbor eNB 123. The control unit 240 is also capable of updating the neighbor resource information of table 2. That is, the control unit 240 is capable of changing the reservation state of the corresponding neighbor resource in the neighbor resource information.

Finally, if the neighbor resource reservation is successful at the neighbor eNB 234 in the resource reservation mode at step 319, the control unit 240 terminates the resource management procedure. That is, after checking the reservation of the neighbor resource at the neighbor eNB 123, the control unit 240 ends the resource management procedure.

If it fails to reserve the neighbor resource of the neighbor eNB 123 in the resource reservation mode at step 319, the control unit 240 detects this at step 321, executes the resource recovery mode, and then terminates the resource management procedure. That is, if it is determined that the per-interference combination resource reservation is not available at step 419, no response is received from the neighbor eNB 123 in response to the neighbor resource reservation request at step 423, or the neighbor resource reservation is rejected by the neighbor eNB 123 at step 425, the control unit 240 determines regards this as the neighbor resource reservation failure. At this time, the control unit 240 determines whether the serving resource corresponding to the neighbor resource of the neighbor eNB 123 is reserved. If the serving resource is reserved, the control unit 240 releases the reservation on the corresponding serving resource. That is, the control unit 240 is capable of increasing the transmission power on the corresponding serving resource to a predetermined level. In this way, the control unit 240 is capable of securing the serving resource for use in downlink. Hereinafter, a description is made of the resource recovery mode execution procedure of the eNB 120 in detail.

Figure 5:
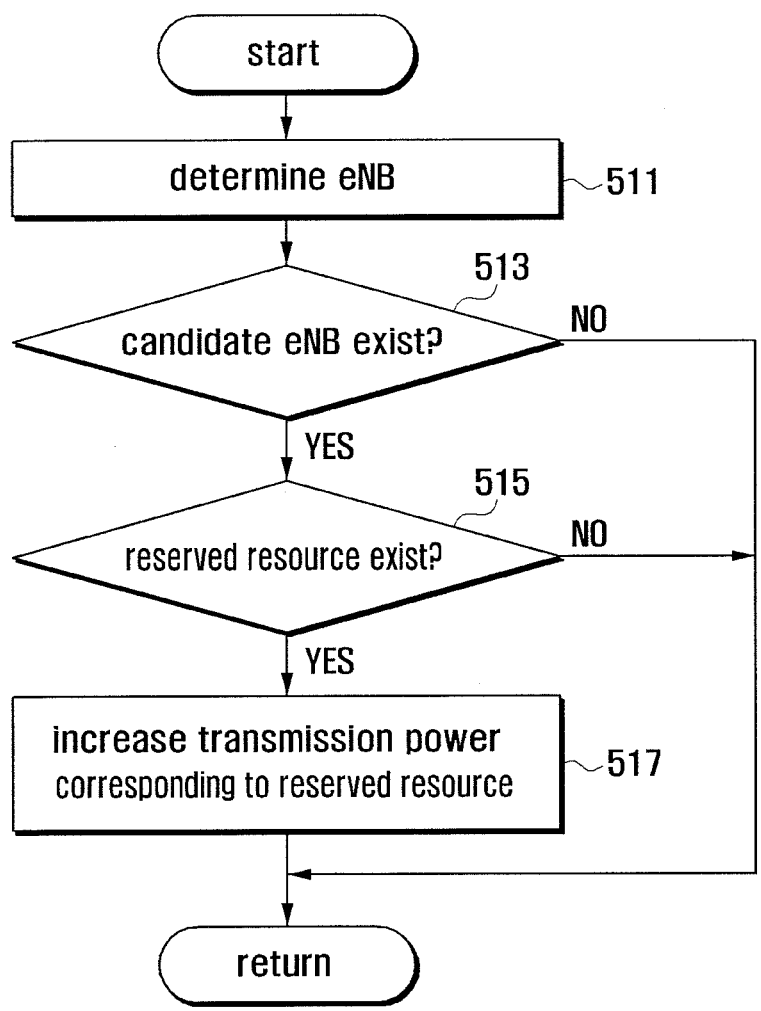
FIG. 5 is a flowchart illustrating the resource recovery mode execution procedure of FIG. 3.

FIG. 5 is a flowchart illustrating the resource recovery mode execution procedure of FIG. 3.

Referring to FIG. 5, the resource recovery mode execution procedure of the eNB 120 according to this embodiment starts with determining a candidate eNB at step 511. That is, the control unit 240 compares the average processing amount of neighbor resource at the neighbor eNB 123 with the processing amount per serving resource at the eNB 120. At this time, the control unit 240 determines whether the average processing amount of the neighbor resource at the neighbor eNB 123 is greater than the processing amount per serving resource at the eNB 120. If the average processing amount of the neighbor resource at the neighbor eNB 123 is greater than the processing amount per serving resource at the eNB 120, the control unit 240 determines the corresponding neighbor eNB 123 as a candidate eNB. Next, the control unit 240 determines whether a candidate eNB exists at step 513.

If it is determined that no candidate eNB exists at step 513, the control unit 240 returns the procedure to FIG. 3. Otherwise, if it is determined that a candidate eNB exists at step 513, the control unit 240 determines whether the corresponding serving resource is reserved in correspondence to the candidate eNB at step 515. At this time, the control unit 240 determines whether there is any reserved serving resource corresponding to the candidate eNB based on at least one of serving resource information of table 1 and reservation resource information of table 3. If there are multiple candidate eNBs, the control unit 240 is capable of arranging the candidate eNBs in a descending order of M values corresponding to the respective candidate eNBs. The control unit 240 is capable of selecting one of the candidate eNBs in the arrangement order to determine whether the serving resource is reserved. If no serving resource is reserved, the control unit 240 selects another candidate eNB to determine whether the serving resource is reserved.

If it is determined that no serving resource is reserved in correspondence to the candidate eNB at step 515, the control unit 240 returns the procedure to FIG. 3. Otherwise, if it is determined that the serving resource is reserved in correspondence to the candidate eNB, the control unit 240 increases the transmission power on the serving resource reserved in correspondence to the candidate eNB to a predetermined level at step 517 and returns the procedure to FIG. 3. That is, the control unit 240 is capable of updating the serving resource information of table 1 and the reserved resource information of table 3. That is, the control unit 240 is capable of changing the reservation state of the corresponding serving resource in the serving resource information and the reserved resource information.

Meanwhile, if the calculation period arrival is not detected at step 313, the control unit 240 supports resource reservation at step 325 and terminates the resource management procedure. At this time, the control unit 240 reserves the serving resource in response to the neighbor eNB 123. That is, if the neighbor eNB 123 requests for reservation of the serving resource, the control unit 240 is capable of reducing the transmission power on the serving resource to a predetermined level. In addition, the control unit 240 is capable of allocating other serving resource for the UE 110 in correspondence to the serving resource. In this way, the control unit 240 is capable of managing the serving resource efficiently. Hereinafter, a description is made of the resource reservation support procedure of the eNB 120 in detail.

Figure 6:
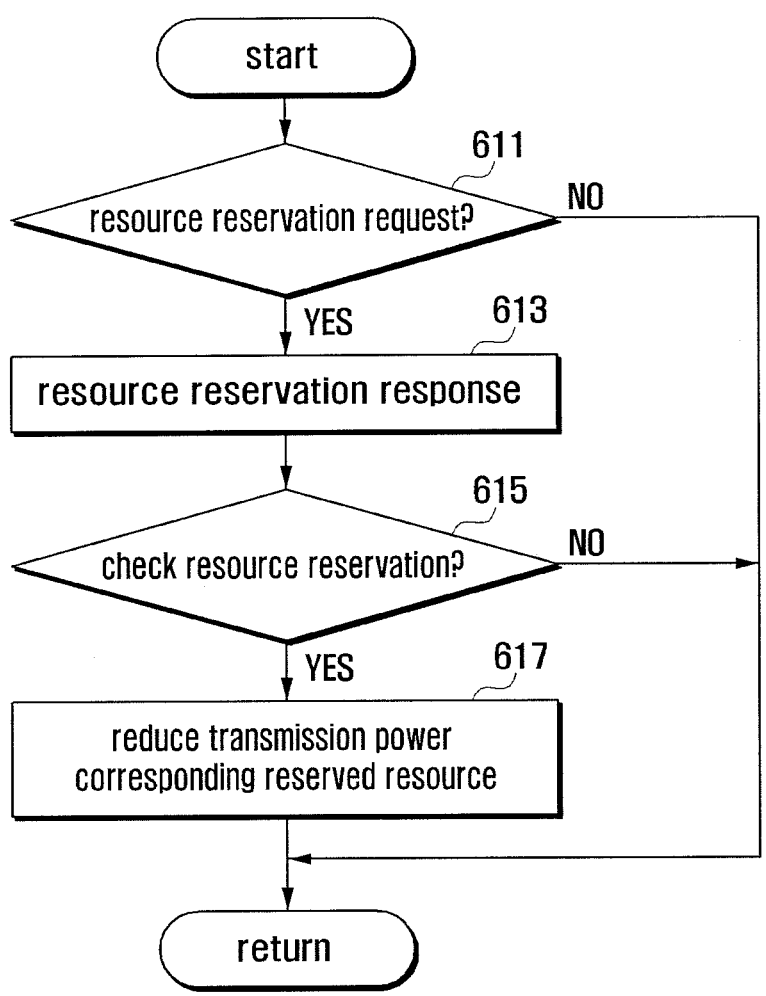
FIG. 6 is a flowchart illustrating the resource reservation support procedure of FIG. 3.

FIG. 6 is a flowchart illustrating the resource reservation support procedure of FIG. 3.

Referring to FIG. 6, the resource reservation support procedure of eNB 120 starts with detecting the request for reserving the serving resource from the neighbor eNB 123 at step 611. That is, when the resource reservation request message is received from the neighbor eNB 123, the control unit 240 detects this. At this time, the resource reservation request message is capable of including a request bitmap indicating the reservation state per serving resource at the serving eNB 120. In the request bitmap, the bit corresponding to the serving resource requested by the neighbor eNB 123 is bit is set to 1.

Next, the control unit 240 replies the serving resource reservation request of the neighbor eNB 123 at step 613. That is, the control unit 240 notifies the neighbor eNB 123 whether the serving resource reservation is accepted. At this time, the control unit 240 sends the resource reservation response message to the neighbor eNB 123. Here, the resource reservation response message is capable of including a response bitmap indicating the reservation states of the serving resources of the eNB 120. That is, it is intended to accept the reservation of the serving resource for the neighbor eNB 123, the control unit 240 is capable of setting the bit corresponding to the serving resource requested by the neighbor eNB 123 to 1 in the response map. If it is intended to reject the reservation of the serving resource for the neighbor eNB 123, the control unit 240 is capable of setting the bit corresponding to the serving resource requested by the neighbor eNB to 0 in the response bitmap.

If it is determined that the reservation of the serving resource at the neighbor eNB 123, the control unit 240 detects this at step 615 and provides the neighbor eNB 123 with the substantial reservation of the serving resource at step 617. That is, the control unit 240 reduces the transmission power on the corresponding serving resource to a predetermined level and returns the procedure to FIG. 3. At this time, it is accepted to reserve the serving resource for the neighbor eNB 123, the neighbor eNB 123 may check the reservation of the serving resource. When the resource reservation confirm message is received from the neighbor eNB 123, the control unit 123 confirms the reservation of the serving cell correspondently. The control unit 240 is capable of updating the serving resource information of table 1 and the reservation resource information of table 3. That is, the control unit 240 is capable of changing the reservation state of the corresponding serving resource in the serving resource information and the reserved resource information.

According to the present invention, the eNB 120 reserves at least one of neighbor resources of the neighbor eNB 123 for reducing transmission power thereat so as to suppress the interference from the neighbor eNB 123 on the serving resource for one of the UEs 110 connected to the eNB 120. The eNB 120 is also capable of suppressing the interference from the eNB 120 on the neighbor resource for one of the UEs connected to the neighbor eNB 120 by reducing the transmission power on at least one of the serving resources for the neighbor eNB 123. Also, when the reservation of specific neighbor resource of the neighbor eNB 123 fails, the eNB 120 releases the reservation on the serving resource corresponding to that of the neighbor eNB 123 to increase the transmission power on the corresponding serving resource and thus secure the serving resource for use in downlink.

In this way, the eNB 120 is capable of managing the serving resource efficiently. In addition, it is possible to manage the resource efficiently in the wireless communication system.

INDUSTRIAL APPLICABILITY

The specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A resource management method of a base station in a wireless communication system, the method comprising:
   calculating, at a serving base station, average resource use amount of serving resources for use in downlink corresponding to multiple terminals;
   selecting, when the average resource use amount is greater than a predetermined threshold, one of terminals, the selected terminal undergoing a highest interference from a neighbor base station; and
   reserving at least one neighbor resources of the neighbor base station for use in downlink for reducing transmission power of selected neighbor resource, the selected neighbor resource corresponding to the serving resource for the selected terminal,
   wherein the reserving comprises:
      determining at least one interference combination including at least one neighbor base station;
      predicting a processing amount per serving resource at the selected terminal in correspondence to the at least one interference combination; and
      reserving at least one of the neighbor resources of the interference combination which is selected among the at least interference combination depending on the predicted processing amount.

2. The method of claim 1, further comprising recovering, when reservation of at least one of the neighbor resources fails, the reserved serving resource by increasing reduced transmission power in correspondence to the serving resource reserved for the neighbor base station.

3. The method of claim 2, further comprising reducing, when one of the serving resources is reserved by the neighbor base station, the transmission power on the reserved serving resource.

4. The method of claim 1, wherein determining comprises checking neighbor base stations via the selected terminal.

5. The method of claim 1, wherein reserving comprises:
   requesting the neighbor base station for reservation of the neighbor resource; and
   confirming, when the neighbor base station accept reservation of the neighbor resource, the reservation of the neighbor resource to the neighbor base station.

6. The method of claim 1, further comprising:
   transmitting indices of the serving resources and transmission power per serving resource to the neighbor base station; and
   sharing, at the neighbor base station, the resource information by receiving the indices of the neighbor resources and transmission power per serving resource.

7. A resource management apparatus of a base station in a wireless communication system, the apparatus comprising:
   a transceiver configured to transmit and receive a signal; and
   a processor configured to:
      calculate average resource use amount of serving resources for use in downlink in corresponding to multiple terminals
      select, when the average resource use amount is greater than a predetermined threshold, one of terminals, the selected terminal undergoing highest interference from a neighbor base station,
      reserve at least one of neighbor resources of the neighbor base station for use in downlink for reducing transmission power of selected neighbor resource, the selected neighbor resource corresponding to the serving resource for the selected terminal,
      determine at least one interference combination including at least one neighbor base station,
      predict a processing amount per serving resource at the selected terminal in correspondence to the at least one interference combination, and
      reserve at least one of the neighbor resources of the interference combination which is selected among the at least interference combination depending on the predicted processing amount.

8. The apparatus of claim 7, wherein the processor is further configured to recover, when reservation of at least one of the neighbor resources fails, the reserved serving resource by increasing reduced transmission power in correspondence to the serving resource reserved for the neighbor base station.

9. The apparatus of claim 8, wherein the processor is configured to reduce, when one of the serving resources is reserved by the neighbor base station, the transmission power on the reserved serving resource.

10. The apparatus of claim 8, wherein the processor is further configured to check neighbor base stations via the selected terminal.

11. The apparatus of claim 7, wherein the processor is further configured to:
   request the neighbor base station for reservation of the neighbor resource; and confirm, when the neighbor base station accept reservation of the neighbor resource, the reservation of the neighbor resource to the neighbor base station.

12. The apparatus of claim 7, wherein the processor is further configured to control the transceiver to:
transmit indices of the serving resources and transmission power per serving resource to the neighbor base station, and share the resource information by receiving the indices of the neighbor resources and transmission power per serving resource.

* * * * *